United States Patent [19]

Boboltz et al.

[11] 3,776,289

[45] Dec. 4, 1973

[54] CUTTING TOOL HOLDER

[75] Inventors: Charles E. Boboltz, Belmont; Frederick K. Zwald; Ralph B. Baldwin, both of East Grand Rapids, all of Mich.

[73] Assignee: Oliver Machinery Company, Grand Rapids, Mich.

[22] Filed: May 18, 1972

[21] Appl. No.: 254,667

Related U.S. Application Data

[63] Continuation-in-part of Ser. No. 60,025, July 31, 1970.

[52] U.S. Cl. ................................... 144/230, 29/105
[51] Int. Cl. .................... B27g 13/04, B26d 1/36
[58] Field of Search .................... 144/230, 218, 240; 29/105

[56] References Cited
UNITED STATES PATENTS

| | | | |
|---|---|---|---|
| 874,871 | 12/1907 | Shimer | 144/230 |
| 1,269,378 | 6/1918 | Bunch | 144/230 |
| 2,814,320 | 11/1957 | Dukes | 144/230 |
| 3,134,412 | 5/1964 | Schmitt | 144/230 |
| 3,408,722 | 11/1968 | Berry | 29/105 |

*Primary Examiner*—Donald R. Schran
*Attorney*—Peter P. Price et al.

[57] ABSTRACT

A plurality of cutting members are individually and detachably mounted on a rotatable drum and arranged in spaced and staggered helical rows. Each cutting member is a separate blade having multiple cutting edges and an indexing block. A seating block engaging the indexing block indexes the cutting blade with the proper projection to engage the work as the drum is rotated. The seating block also indexes the cutting edge to make a linear "plane" on the work surface and permits blade sharpening to be done by a cutting tool operable in a direction parallel to the drum axis. A pin projects from the seating block into a precisely located index hole to control the height of projection of the blade. The pressure lock for the blade acts directly on the blade. The cutting member and indexing block are permanently attached by offsetting a portion of the block into an opening in the blade.

6 Claims, 9 Drawing Figures

CUTTING TOOL HOLDER

CROSS REFERENCE TO RELATED APPLICATION

This is a continuation-in-part application of parent application Ser. No. 60,025 filed July 31, 1970 and entitled ROTARY CUTTER.

BACKGROUND OF THE INVENTION

This invention relates to a rotary cutter or planer and, more specifically, to a new and improved means for mounting and indexing the cutting blade in the cutter.

The prior art includes numerous planers, each of which has one or more serious drawbacks. These drawbacks include failure to produce a smooth surface, difficulty and cost of both sharpening and of replacing worn or damaged blades. Another problem has been the noise level generated by their operation.

SUMMARY OF THE INVENTION

To solve the problems and disadvantages of these cutting or planing tools, Applicants have invented a new and improved cutter (S.N. 60 025 filed July 31, 1970 entitled ROTARY CUTTER) having a rotatable drum with a plurality of spaced and staggered sockets adapted to receive detachable cutting members having a work engaging blade projecting beyond the drum periphery. The blade is provided with a plurality of curvilinear cutting edges along with means whereby each of the cutting edges could be successively moved to a work engaging position. The cutting member was mounted in the socket for rotation with the drum and included means for indexing and seating the cutting edge at both a preselected orientation and projection with respect to the drum and work product. Locking means was provided for frictionally anchoring the cutting member in the socket in a positive and facile fashion.

The advantages provided by our earlier invention have proven to be as successful as anticipated. Subsequent experience, however, has led to the development of an even newer and improved way of mounting and indexing the individual cutting tools in the sockets which eliminates any operator error while at the same time providing greater simplicity and flexibility at reduced manufacturing costs.

According to this invention, a cutting tool adapted to seat in a socket is comprised of a cutting blade; a seating element and a locking member. The blade is positioned on the seating element which is locked into the socket by the locking member. The seating element includes an indexing pin projecting beyond its sidewall and receivable in a hole formed in the sidewall of the socket. Cooperation between the recess and pin positively indexes the radial position, relative to the drum, of the seating block and, thus, the blade with respect to the drum. The locking member includes a wedge block which produces wedge engagement between the seating element and the socket walls to prevent unintentional removal thereof. In addition, it bears directly on the blade to wedge it against the seating element by clamping the blade against the seat.

The distance from the lower surface of the pin to the lower surface of the seating element is less than the distance from the lower surface of the recess to the socket floor so that the seating element is always spaced from the socket floor. Thus, the radial position of the cutting blade with respect to the drum is determined solely by cooperation between the pin and recess.

The particular advantage of this aspect is twofold. First, it eliminates operator error in setting the amount of projection of the blade. Secondly, it eliminates costly close tolerence machining of the socket since its precise depth becomes unimportant. Correctly positioning the radial position of the pin socket in the drum is a much simpler operation.

In another preferred aspect of this invention, the cutting blade is positively positioned on the seating element by an indexing block affixed to the blade. This invention provides a wedging block which directly engages the blade instead of the index block, thereby applying the stresses incident to locking the blade in position directly to the blade rather than through the index block as heretofore required. As a result of this aspect, it is no longer necessary to braise the blade and index block together to assure a connection which will withstand these forces. A simple adhesive bond is all that is required. In yet another preferred aspect, a noncircular center opening is provided in the blade. The index block is then attached to the blade by deforming a portion of the index block into the opening to prevent any relative rotation between the blade and block. This materially reduces the cost of the assembly.

Thus, this invention provides a rotary cutter having all of the advantages of the parent application referred to above while at the same time providing significant improvements in mounting and indexing the cutting blade in a less expensive, less complex and more positive fashion.

DETAILED DESCRIPTION OF THE PREFERRED EMBODIMENTS

The particular environment chosen to describe this invention is a rotary cutter comprised of a rotatable drum 10 having a plurality of sockets 14 arranged in spaced and staggered helical rows. An individual and detachable cutter assembly 20 is inserted in each socket. While the aspects of this invention are particularly adapted for this type of cutter, the novel depth and angle control of the blade relative the work piece is envisioned for application to a variety of different types of cutters. Also, this invention is adaptable for use with various conventional cutting and planing machines, the details of which are unimportant for the purpose of this disclosure. Although, for convenience, the following description pertains to a wood cutter or planer, it is envisioned that any type of material (ferrous or non-ferrous) could be worked utilizing the teachings of this invention.

Figure 1:
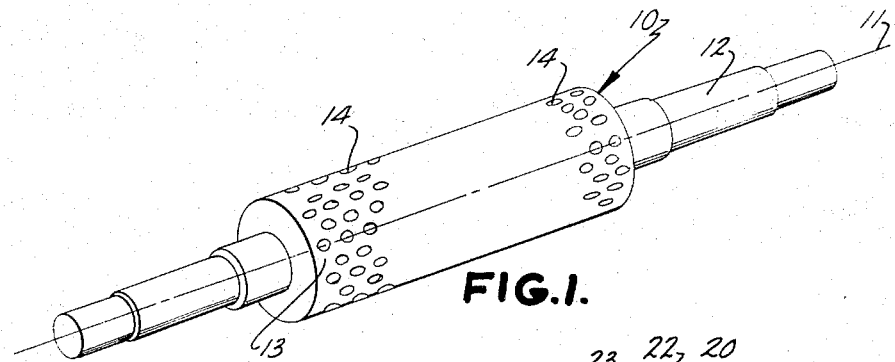
FIG. 1 is a perspective view of the rotatable drum for mounting the blades.

Turning now to the drawings in detail, FIG. 1 shows a drum 10 affixed to a shaft 12. The drum is designed to be rotatably mounted in a conventional planer. The planer itself, is not shown since it may be any of numerous conventional machines currently available. Preferably, the drum is cylindrical and includes a peripheral surface 13 and a plurality of sockets 14 bored into the drum facing for detachably receiving the individual cutter assemblies 20.

Figure 2:
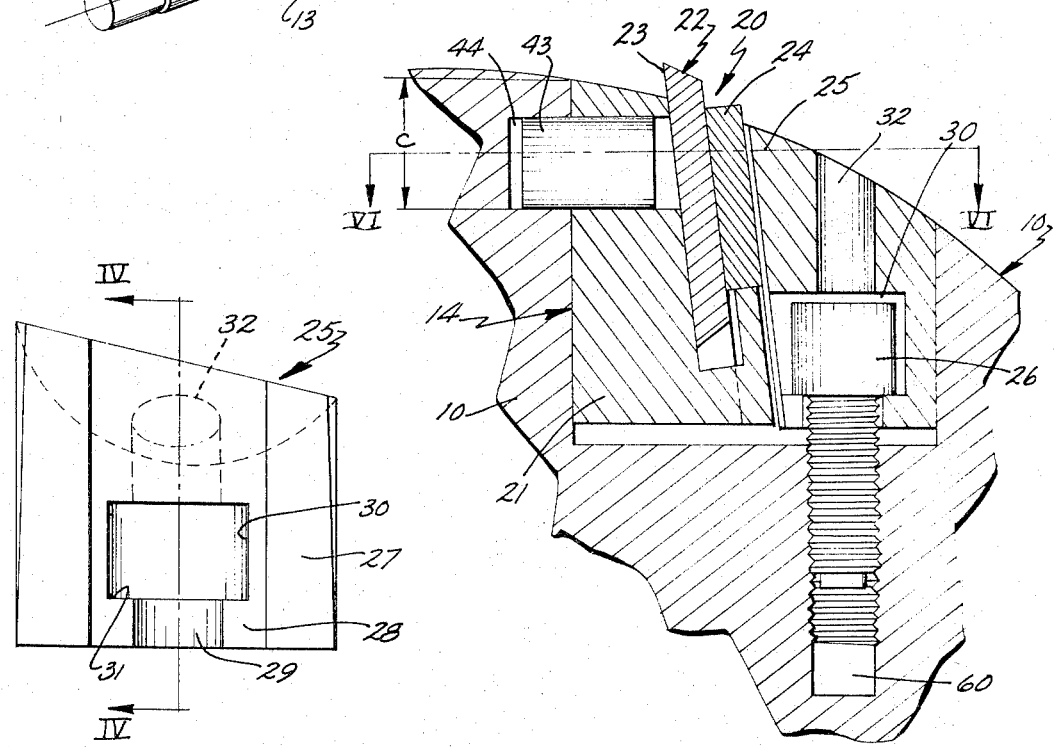
FIG. 2 is an enlarged cross-sectional view showing the cutter member proposed by this invention mounted in a drum bore.
Figure 3:
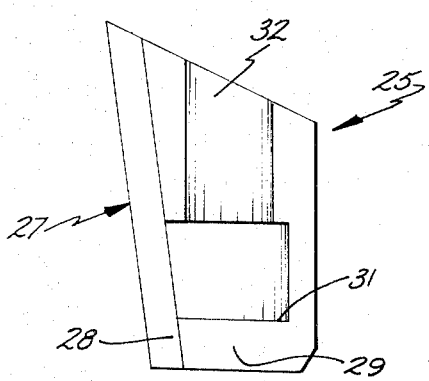
FIG. 3 is a front elevational view of the wedge block shown in FIG. 2.

FIG. 2 is a cross section of one of the sockets and shows a cutter assembly 20 comprised of a seating block 21, a cutting tool 22 having a cutting blade 23 and indexing block 24, a wedge block 25 and a locking stud 26 threadably engaging the drum. The wedge block 25 has an upwardly inclined flat surface 27 (FIG. 5) having a central vertical channel 28. The other surface of the wedge block is curved to seat snuggly against the wall of the socket 14. The wedge block also has a slot 29 opening through the inclined wall of the channel 28. The slot 29 permits the locking stud 26 to be inserted, the upper portion of the slot being enlarged at 30 to receive the head of the locking stud. The bottom of this enlargement provides a bearing surface 31 for the stud head. Tool access to the top of the locking screw is provided by the hole 32.

Figures 4, 5:
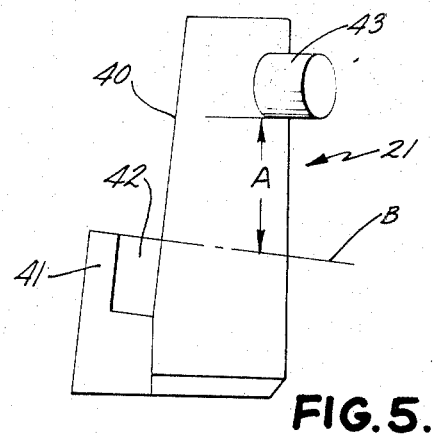
FIG. 4 is a sectional view of the wedge block taken along line IV—IV of FIG. 3.
FIG. 5 is an end view of the seating block shown in FIG. 2.

The seating block 21 cooperates with the wedge block 25. One surface 40 of the seating block is inclined identically to the inclination of the surface 27 on the wedge block (FIGS. 2 and 5). The other surface is curved to seat snuggly against the wall of the socket 14. The seating block has an upwardly extending index finger 41 inclined at the same angle as the face 40. The index finger 41 is spaced from the face forming a pocket 42 and at its lower end is integral with the rest of the seating block. This spacing is such that the cutting blade 23 can pass between the face 40 and the index finger 41.

Near its upper end, an index pin 43 projects radially from the curved face of the seating block. It is very important to this invention that the dimension A (FIG. 5) be accurately controlled because this is one of the dimensions which index the distance the cutting blade 23 projects beyond the surface of the drum 10. The dimension A represents the distance between the bottom of the pin 43 and a plane B passing through the top surface of the index finger 41. The index pin 43 seats in a hole 44 (FIG. 6) machined in the sidewall of the socket 14. The dimension C (FIG. 2) representing the distance between the surface of the drum 10 at the socket and the bottom of the hole 44 must also be accurately maintained since this dimension coupled with dimension A controls the height the cutter blade 23 projects beyond the drum surface. Because of the nature of machine tools, the accuracy of dimension C can be maintained much more easily than can the depth of the socket, the index means used in our previous construction.

Figure 7:
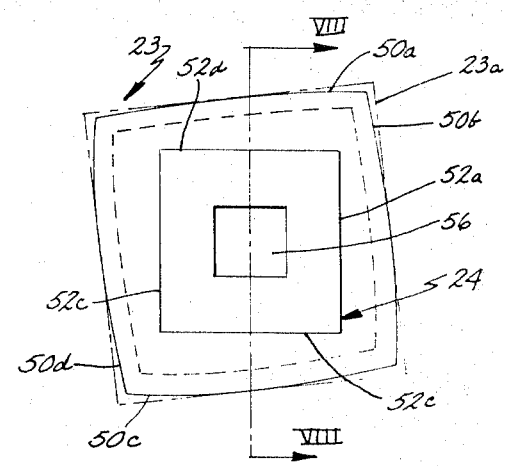
FIG. 7 is a rear elevational view of the cutting blade and indexing block shown in FIG. 2.
Figure 8:
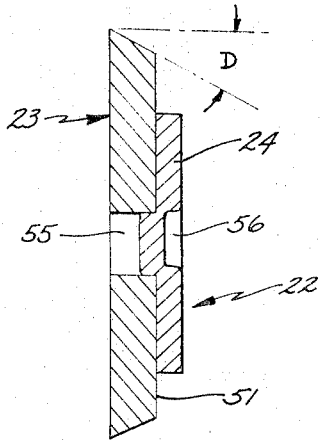
FIG. 8 is a sectional view of the cutting blade and indexing block taken along line VIII—VIII of FIG. 7.
Figure 9:
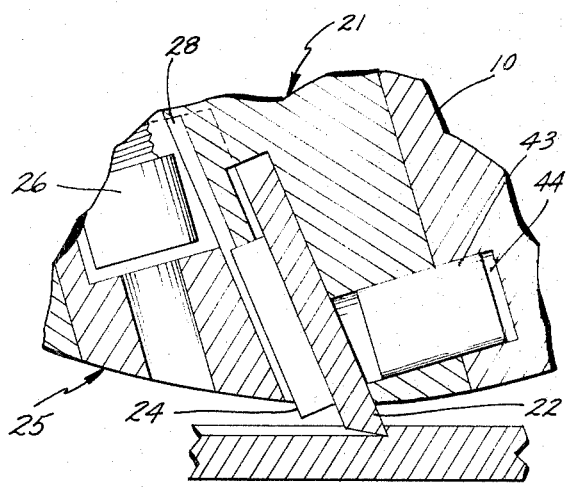
FIG. 9 is an enlarged fragmentary sectional view showing the cutter assembly of this invention in work piece engaging position.

Cutting blade 23 is shown in detail in FIGS. 7 and 8. In has been found that in terms of blade hardness, strength, fatigue and longevity, that a metal such as tungsten carbide proves very satisfactory in wookworking. The original configuration of the blade as shown in FIG. 7 by the numeral 23a, is square (in outline) and has a thickness relatively small with relation to its peripheral dimension. The four initially square sides are shaped by conventional means, such as machining, into the tapered and curvilinear configuration shown in solid lines in FIG. 7. In the preferred embodiment, the taper or bevel angle D (FIG. 8) is approximately 25° while the arc of curvature is that of a circle approximately 26 times the radius of the drum. The significance of these dimensions is described in detail in our original application, previously identified. It should be realized that depending upon the nature of the material to be worked and work objectives, these dimensions may vary significantly. As described, blade 22 has four identical cutting edges 50a, 50b, 50c and 50d, each one of which can be positioned in work engaging position as shown in FIG. 2. Common to all of the cutting edges is the frontal or knife face 38. The preceding description is that of a blade identical to that described in our earlier application to which reference has previously been made.

Affixed to the back side 51 of cutting blade 23 is a square indexing block 24, shown in detail in FIGS 7 and 8. The purpose of index block 34 is to properly position the cutting blade in the cutter assemblies 20 so that the particular cutting edge in use is accurately positioned with respect to both the drum and to all the other blades mounted on the drum. The index block is dimensionally analogous to the cutting blade in that it will have a similar number of sides or stop surfaces 52a, 52b, 52c and 52d, each of which is designed to seat on the index finger 42 of the seating block 21 to automatically and accurately index the selected cutting edge. Since the blade 23 has four identical cutting edges, it is necessary that index block 24 be centered with respect to cutting blade 22. It must have the identical relationship to each cutting edge. Although the index block is centered with respect to the cutting blade, its sides are not aligned with the respective sides of the cutting blade but are positioned at an angle to them so that its sides are non-parallel to the original sides of the cutting blade shown in outline in FIG. 7. This arrangement positions the blade to make a smooth cut on the work piece leaving a surface parallel to the longitudinal axis of the drum. This arrangement is necessary because the blade is moving in a circular path and is also inclined to the rotational axis of the drum, thus making a planing rather than a chipping type of cut. The material is planed or peeled off the work piece surface instead of sheared or chopped off as would result from the entire length of the cutting edge making simultaneous contact with the work surface.

The cutting blade 23 has a centrally located square hole 55. To attach the index block 24 to the blade 23, the center of the index block 24 is offset at 56 into the hole 55 forming a firm, positive lock between the two parts (FIG. 8). Heretofore, the attachment has had to be effected by brazing - a slow and expensive procedure. By offsetting, the cost of each blade is materially reduced. As will be explained subsequently, the use of the offset or interference type of joint is made possible by another facet of this invention whereby the index block serves only the purpose of positioning and is relieved of the work of holding the blade during actual operation. By using a square hole 55, the index block 56 is positively locked against any rotation with respect to the blade, a necessity for maintaining proper blade position. The offset 56 can be effected by any of a number of conventional tools such as a punch press.

Figure 6:
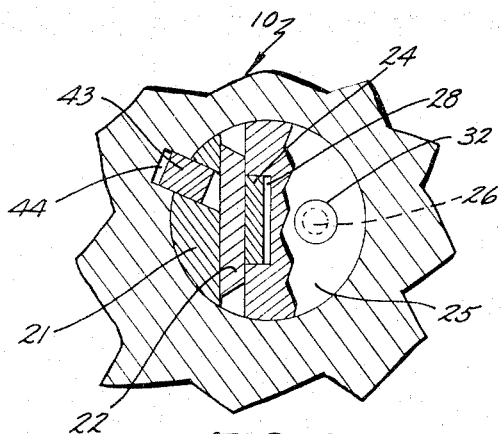
FIG. 6 is a sectional view taken along the plane VI—VI of FIG. 2.

It will be observed in FIG. 6 that the width of the channel 28 is just sufficient to slidably receive the index block 24 with just sufficient play to permit the bottom of the index block to seat squarely on the index finger 41. It will also be observed from FIG. 2 that the depth of the channel 28 is greater than the thickness of the index block 24 eliminating any possibility of the index block bearing against the bottom of the channel.

In assembling the cutter assembly 20, the seating block 21 is first inserted in the socket and the index pin 43 seated in the slot 44. This automatically and accurately positions the seating block radially with respect to the surface of the drum 10. The cutting tool 22 is seated against the inclined face 40 of the seating block and on the index finger. The lock stud 26 is assembled to the wedge block 25 and the wedge block inserted in the socket 14.

By tightening the lock screw 26, the wedge block is drawn further into the socket 14. Because of the inclination of the faces 40 and 27, this results in the wedge block clamping the cutting blade 23 between it and the seating block 21. The clamping pressure is exerted directly on the cutting blade on each side of the index block 24. No clamping pressure is exerted on the index block. Thus, the index block serves only the function of locating the cutting tool 22 and does not have to sustain any of the forces incident to locking the cutting tool in position. This arrangement has a twofold advantage. It provides maximum clamping effect to hold the tool and also makes it possible to utilize the offset method of assembling the index block and cutter blade as illustrated in FIG. 8.

It is very important that the bottoms of both the seating and wedging blocks do not contact the bottom of the socket 14. Unless clearance between the wedging block socket bottom is maintained, inadequate clamping pressure may result, permitting the blades to be thrown by the drum.

It will be appreciated that if there is any outward or radial movement of the cutting blade 22, the work piece and blade will in all probability be destroyed. Due to the high angular velocity of the drum, the centrifugal force to which the cutting tools are subjected is very high. The wedge relationship between seating block 21 and wedge block 25 provides a positive lock for the cutting tool.

The shear angle of the blade is determined by the circumferential location of the pin 43 on the seating block which preselects the angular orientation of the cutting blade to the longitudinal axis of the drum. The shear angle is that which the knife edge of the cutting blade makes with the work piece with respect to the path of travel of the blade across the work piece. The hole 44 always has the same location and the tapped opening 60 for the locking stud 26 must be oriented to it. When the location of the pin 43 is changed circumferentially of the seating block this rotates the tool assembly 20 and necessitates relocation of the tapped opening 60.

This invention provides all of the advantages of our invention as set out in our copending application Ser. No. 60,025, to which reference has previously been made. In addition, this invention provides an improved means of holding the cutting blade and reduces the cost and manufacture of the blades. It also permits more accurate indexing of the blades, using simplified and less costly machining methods. Collectively, these add up to a very significant improvement of the tool.

A preferred embodiment of this invention has been illustrated and described. It will be apparent to those skilled in the art that various changes and modifications may be made therein without departing from the principles of this invention or from the scope of the appended claims.

The embodiments of the invention in which an exclusive property or privilege is claimed are defined as follows.

1. an improved assembly for detachably mounting a cutting member to a rotatable drum, said cutting member having a cutting edge projecting beyond the periphery of said drum in a work engaging position, said drum having a socket for receipt of said cutting member, the improvement comprising: said socket having a recess extending into said drum from the sidewall of said socket; a seating element having a seat thereon for positioning said cutting member and cutting edge relative to said seating element and an outer surface for engaging a portion of said socket wall, and an index pin extending beyond said outer surface into said socket recess for automatically indexing said seating element and spacing said seat with respect to the surface of said drum.

2. The improved assembly according to claim 1 wherein there are provided a cutting blade and a locking block both receivable in said socket; said seating element and locking block having complementary faces inclined outwardly toward said index pin; said cutting blade received between said seating element and said locking block with a portion thereof resting on said seat; means to shift said locking block relative to said seating element to clamp said cutting blade between said complementary faces.

3. The improved assembly according to claim 2 wherein said portion of said cutting blade is an index block projecting from one face thereof; said locking block having a channel in its complementary face, the depth of said channel being greater than the thickness of said index block whereby none of the clamping pressure for securing said blade is applied to said index block.

4. The improved assembly for detachably mounting a cutting member described in claim 1 wherein there is provided a cutting blade and a locking block both receivable in said socket; said cutting blade having an index block resting on said seat and means for shifting said locking block to clamp said blade between it and said seating element, one of said seating element and said locking block being so shaped that said clamping pressure is applied only to said blade.

5. The improved assembly for detachably mounting a cutting member described in claim 4 wherein said cutting blade has an aperture and a portion of said index block is offset into said aperture to secure together said blade and index block.

6. The improved assembly for detachably mounting a cutting member described in claim 5 wherein said aperture is rectangular to prevent relative rotational displacement of said cutting blade with respect to said index block.

* * * * *